Dec. 10, 1940.  A. W. GRIEPENSTROH  2,224,676
SHOCK ABSORBER
Filed Feb. 24, 1938
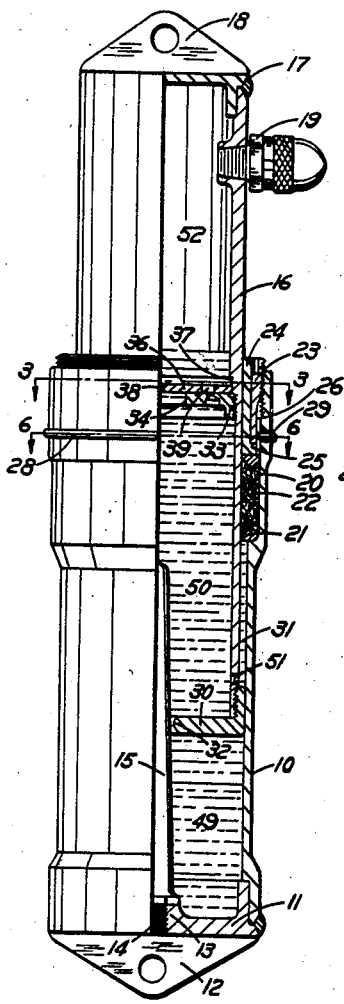
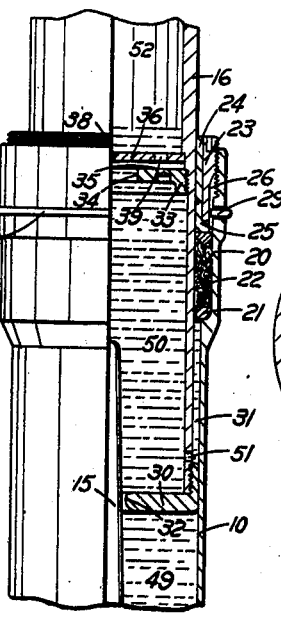
ARTHUR W. GRIEPENSTROH
INVENTOR Patented Dec. 10, 1940

2,224,676

UNITED STATES PATENT OFFICE 2,224,676

SHOCK ABSORBER

Arthur W. Griepenstroh, Cleveland, Ohio, assignor to The Cleveland Pneumatic Tool Company, Cleveland, Ohio, a corporation of Ohio Application February 24, 1938, Serial No. 192,298

5 Claims. (Cl. 267—64)

This invention relates broadly to shock absorbers, but more particularly to hydro-pneumatic shock absorbers designed for use upon airplanes to cushion impacts of landing and taxiing.

One object of this invention is to produce a shock absorber of relatively simple construction, forming a compact and light assembly which is strong, durable and efficient.

Another object of this invention is to provide a shock absorber with a valve active for controlling the rebound strokes of the shock absorber, the valve being mounted in a manner eliminating certain parts heretofore employed for that purpose, and thereby reducing the weight of the assembly.

Another object of this invention is to provide a shock absorber comprising two telescoping members, with novel sliding bearings preferably made of non-ferrous metal.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combinations of parts and specific constructions indicative of the scope and spirit of the invention.

In the drawing:

Fig. 1 is a side elevational view partly in section of a shock absorber embodying the invention.

Fig. 2 is a fragmental view of the shock absorber shown in Fig. 1, illustrating movable parts in a different position.

Fig. 3 is an enlarged cross sectional view taken in a plane indicated by line 3—3 in Fig. 1.

Fig. 4 is a view similar to Fig. 2 showing a modification of the invention.

Fig. 5 is an enlarged cross sectional view taken in a plane indicated by line 5—5 in Fig. 4.

Fig. 6 is a cross sectional view taken in a plane indicated by line 6—6 in Fig. 1.

Referring to the drawing in which like symbols designate corresponding parts throughout the several views, 10 represents an outer cylinder closed at its lower end by a plug 11 formed with a clevis 12, through which this cylinder may be attached to the landing wheel axle. This plug is provided with a centrally disposed threaded bore 13 having mounted therein the threaded end 14 of a metering pin 15, which extends upwardly within the cylinder 10.

Reciprocable within the outer cylinder 10, there is an inner cylinder 16 having its upper end protruding beyond the upper open end of the cylinder 10, and closed by a plug 17 forming a clevis 18 through which the inner cylinder may be attached to the fuselage of the airplane. Suitably mounted within the side wall of the inner cylinder 16, there is a filler plug 19, the purpose of which will be explained later.

The upper end, in Fig. 1, of the cylinder 10 is enlarged to form a stuffing-box 20 including a ring 21 resting on the bottom thereof in space relation with the cylinder 16. This ring carries suitable packings 22 affording a fluid tight joint between the two cylinders, which packings are compressible by a gland nut 23 screwed within the upper end of the packing chamber. This nut is lined with a removable bushing 24 terminated at its lower end by an annular flange 25 engaging the adjacent end of the nut for preventing axial removal of the bushing, which bushing is preferably made of non-ferrous metal such as bronze or the like, affording an adequate sliding bearing for the inner cylinder 16.

To prevent accidental rotation of the nut 23 relative to the outer cylinder 10, there is provided a locking device including longitudinally disposed external splines 26 formed on the lower portion of the nut 23. Adjacent the splines 26, the outer cylinder 10 is provided with an external annular groove 27 accommodating a partly circular spring wire clip 28 having one end bent inwardly to form a locking pin 29 extending through the wall of the cylinder 10 into one of the splines 26 for preventing accidental rotation of the nut 23.

The inner end of the inner cylinder 16 is externally threaded to receive a piston 30 in slidable engagement with the outer cylinder. This piston, like the bushing 24 is preferably made of bronze or the like, and forms the lower end of an annular chamber 31 located between the two cylinders 10 and 16, while the upper end of this chamber is closed by the packings 22. The piston 30 is provided with a centrally disposed metering orifice 32 through which the metering pin 15 is free to slide.

Intermediate its ends, the inner cylinder 16 is internally threaded to receive a partition 33 spaced from the piston 30 a distance substantially equal to the length of the metering pin 15, and formed with a central orifice 34. The upper end wall of this partition forms a relatively large annular seat 35 for a plate valve 36, which valve is also engageable with a smaller annular seat 37 machined within the wall of the inner cylinder 16. The valve 36 is provided with a small central port 38, and a plurality of larger ports 39 circularly disposed between the marginal edges of the valve seat 35.

In the modification shown in Figs. 4 and 5, the inner cylinder 40 is also internally threaded to receive a partition 41 formed with a central orifice 42. This partition is provided with a counterbore 43 the bottom of which constitutes a valve seat 44. Carried by the partition 41, there are several headed posts 45 extending through a plate-valve 46, which valve is urged and normally maintained on the seat 44 by compression springs 47 carried by the posts 44. The diameter of this valve is smaller than the corresponding diameter of the counterbore 43, and like the valve 36, it is also provided with a small central port 48.

From the foregoing description, it will be understood that the outer cylinder 10 forms between the plug 11 and the piston 30 a piston chamber 49 within which is slidably mounted the piston 30. Between the piston 30 and the partition 33, there is formed within the inner cylinder 16 a cylindrical chamber hereinafter denoted as auxiliary chamber 50, which is in constant communication with the annular chamber 31 through one or more ports 51 extending through the wall of the inner cylinder 16. Between the partition 33 and the plug 17, there is, within the inner cylinder 16, another cylindrical chamber hereinafter denoted as the compression chamber 52.

When the shock absorber is installed on an airplane and is in a retracted position, the filler plug 19 is removed and a predetermined quantity of hydraulic fluid such as oil or other suitable liquid is poured into the compression chamber 52 from where it will flow into the chambers 50, 31 and 49. The amount of liquid poured into the shock absorber is calculated to maintain the liquid level above the piston 30 in every position of the cylinder 16 relative to the cylinder 10. After the filler plug is again secured in position, compressed air is admitted into the compression chamber 52 through an air valve, not shown, located within the plug 19. When the compressed air within the compression chamber 52 reaches a predetermined pressure, which pressure is variable to suit the load of the airplane, the shock absorber is ready for use.

During operation, the shock resulting from the landing of the airplane will cause the cylinders to telescope, forcing the liquid from the piston chamber 49 through the metered orifice 32 into the auxiliary chamber 50, and therefrom into the annular chamber 31 through the port 51, from where it will act on the packings 22 for assuring a fluid tight joint between the two cylinders. From the auxiliary chamber 50, the liquid will also act on the plate-valve 36 for shifting and maintaining it in the position shown in Fig. 2, allowing liquid to flow into the compression chamber 52 via the valve ports 42. During this compression stroke, the displacement of the liquid is retarded by the action of the compressed air thereon, and by the metering pin 15 sliding through the piston orifice 32, which metering pin is of a configuration calculated to offer a resistance to the flow of the liquid in a manner affording with the action of the compressed air on the liquid, a very efficient cushioning action giving a satisfactory work curve.

On the rebound stroke, the liquid within the compression chamber 52 acted upon by the compressed air will shift and maintain the plate-valve 36 in the position shown in Fig. 1, wherein the valve-ports 39 are closed by the valve seat 35. In this position of the valve, the liquid will be forced through the small valve-port 38 into the auxiliary chamber 50, and therefrom into the piston chamber 49 via the metered orifice 32. This restricted flow of the liquid is also calculated to produce an efficient cushioning action giving an adequate work curve.

In the modification shown in Figs. 4 and 5, the action of the valve 46 is the same as that of the valve 36, except that the valve is lifted against the effort of the compression springs 47 for allowing the flow of the liquid between the valve 46 and the valve seat 44, and then between the periphery of the valve and the counterbore 43. On the return stroke, the valve 46 is shifted and maintained in the position shown in Fig. 4 by the compression springs 47.

In the present construction, the gland nut 23 lined with the bronze bushing 24 affords an efficient sliding bearing for the cylinder 16, while the nut proper can be made of any suitable steel alloy adapted to resist wear of its threaded and splined portions resulting from the adjustments of the nut.

From the foregoing description, it will be understood that the inner cylinder 16 carries the metered orifice 32 for controlling the compression stroke of the shock absorber and the partition 33 and valve 36 for controlling its return or rebound stroke, thereby eliminating the use of a special housing for carrying the valve 36. It will also be understood that even though two types of valves are shown and described, other suitable valves could well be used without departing from the scope and spirit of the invention as herein claimed.

I claim:

1. In a shock absorber, two telescoping cylinders adapted to be interposed between the parts whose relative movements are to be cushioned, the smaller of said cylinders being of a uniform external diameter and having internal portions of differential diameters forming at their junction an annular seat, a piston carried by the smaller cylinder having an orifice therethrough, a metering pin carried by the other cylinder slidable through said orifice upon telescopic movement of said cylinders for progressively changing the size of said orifice, a fixed partition within the smaller cylinder adjacent said annular seat, a passage through said partition, and a flap valve slidable between said partition and seat for controlling said passage.

2. In a shock absorber, two telescoping cylinders having liquid stored therein, the smaller of said cylinders being of a uniform external diameter and being formed of two internal portions one larger than the other and slidable within the other cylinder, said portions forming at their junction an annular valve seat, a piston carried by the smaller cylinder having an orifice therethrough, a metering pin carried by the other cylinder slidable through said orifice upon telescopic movement of said cylinders for progressively changing the size of said orifice, a second annular valve seat on the inner wall of the smaller cylinder longitudinally spaced from and larger than the other seat, a flap valve alternatively engageable with said seats, and ports through said valve adapted to be closed by the larger of said seats during engagement of the valve therewith and be opened during engagement of the valve with the other of said seats.

3. In a shock absorber, two telescoping cylinders having liquid stored therein, a piston carried by the smaller cylinder having an orifice therethrough, a metering pin carried by the other cylinder slidable through said orifice upon telescopic movement of said cylinders for progressively changing the size of said orifice, a duality of fixed longitudinally spaced annular valve seats on the internal wall of said smaller cylinder one wider than the other, said valve seats being located above said metering pin irrespective of said telescopic movement, a flap valve alternatively engageable with said seats, and ports through said valve adapted to be closed by the larger of said seats during engagement of the valve therewith and open during engagement of said valve with the other valve seat.

4. In a shock absorber, two telescoping cylinders having liquid stored therein, a piston on the inner end of the smaller cylinder, an annular valve seat and a partition fixed on the inner wall of said cylinder, said seat and partition being independent of said piston and spaced longitudinally relative thereto, a passage through said partition, and a flap valve slidable between said seat and partition for controlling said passage.

5. In a shock absorber, two telescoping cylinders having liquid stored therein, the smaller of said cylinders being of a uniform external diameter and having its normal inner wall intermediate the ends thereof shaped to form an annular seat, a partition fixed on said inner wall longitudinally spaced from said seat, a passage through said partition, and a flap valve slidable between said seat and partition for controlling said passage.

ARTHUR W. GRIEPENSTROH.